United States Patent
Cooke

(10) Patent No.: US 11,194,912 B2
(45) Date of Patent: *Dec. 7, 2021

(54) METHOD FOR PATCHING AND UPDATING ENCRYPTED DISK IMAGES IN A RELIABLE AND SECURE FASHION

(71) Applicant: Microsoft Technology Licensing, LLC, Redmond, WA (US)

(72) Inventor: Simon Lee Cooke, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/077,307

(22) Filed: Oct. 22, 2020

(65) Prior Publication Data

US 2021/0042416 A1    Feb. 11, 2021

Related U.S. Application Data

(63) Continuation of application No. 16/370,819, filed on Mar. 29, 2019, now Pat. No. 10,853,495.

(51) Int. Cl.
| | |
|---|---|
| *G06F 21/57* | (2013.01) |
| *G06F 8/61* | (2018.01) |
| *G06F 8/65* | (2018.01) |
| *G06F 21/62* | (2013.01) |
| *H04L 9/06* | (2006.01) |
| *H04L 9/08* | (2006.01) |

(52) U.S. Cl.
CPC .............. *G06F 21/57* (2013.01); *G06F 8/63* (2013.01); *G06F 8/65* (2013.01); *G06F 21/6209* (2013.01); *H04L 9/0643* (2013.01); *H04L 9/088* (2013.01)

(58) Field of Classification Search
USPC ......................................................... 717/168
See application file for complete search history.

(56) References Cited

U.S. PATENT DOCUMENTS

| | | | | |
|---|---|---|---|---|
| 7,178,021 | B1* | 2/2007 | Hanna ................. | G06F 21/6209 713/150 |
| 7,865,479 | B2* | 1/2011 | Gu .......................... | G06F 8/658 707/693 |

(Continued)

OTHER PUBLICATIONS

"Applying File Deltas to an Encrypted File"; StackExchange.com website [full url in ref.]; Aug. 27, 2011 (Year: 2011).*

(Continued)

*Primary Examiner* — Qing Chen
*Assistant Examiner* — Clint Thatcher

(57) ABSTRACT

Aspects of the present disclosure disclose provide systems and methods for updating, or patching, encrypted image files located at a remote location. More specifically, a content update package that includes encrypted information is received and decrypted. Based on the content update package, a first portion of data in an encrypted image file is located, where the first portion data is to be decrypted and updated based on data in the content update package. The updated data may then be encrypted, verified, and stored. When the updating, or patching, process is complete, the file version located at the remote location is the same as the latest file version. In addition, the updating, or patching, process may be split between multiple operating systems.

20 Claims, 12 Drawing Sheets

(56) References Cited

U.S. PATENT DOCUMENTS

| | | | | |
|---|---|---|---|---|
| 8,555,273 | B1* | 10/2013 | Chia | G06F 8/654 |
| | | | | 717/173 |
| 8,904,374 | B2* | 12/2014 | Nakamura | G06F 8/66 |
| | | | | 717/170 |
| 2006/0004756 | A1* | 1/2006 | Peleg | G06F 8/658 |
| 2010/0232604 | A1* | 9/2010 | Eklund, II | H04L 9/14 |
| | | | | 380/210 |
| 2013/0013907 | A1* | 1/2013 | Marino | G06F 21/56 |
| | | | | 713/2 |
| 2018/0349129 | A1* | 12/2018 | Ju | G06F 8/654 |
| 2019/0265965 | A1* | 8/2019 | Acharya | H04L 63/0823 |
| 2020/0012488 | A1* | 1/2020 | Koval | G06F 8/71 |

OTHER PUBLICATIONS

"Merkle Tree"; Wikipedia.org website; Feb. 22, 2019 (Year: 2019).*
Craig Gentry; "A Fully Homomorphic Encryption Scheme"; PhD Dissertation, Standford University website [full url in ref.]; Sep. 2009 (Year: 2009).*

* cited by examiner

METHOD FOR PATCHING AND UPDATING ENCRYPTED DISK IMAGES IN A RELIABLE AND SECURE FASHION

CROSS-REFERENCE TO RELATED APPLICATIONS

This application is a continuation application and claims priority to U.S. patent application Ser. No. 16/370,819 (now U.S. Pat. No. 10,853,495), filed Mar. 29, 2019, entitled "METHOD FOR PATCHING AND UPDATING ENCRYPTED DISK IMAGES IN A RELIABLE AND SECURE FASHION," which application is incorporated herein by reference in its entirety.

BACKGROUND

As new content and capabilities of a software applications become available, an update management system may be tasked with bringing instances of software applications located in remote locations running non-current versions to a current status. In instances where content is located at a console, such as a game console or other device, updates to the game, or title, are often necessary to unlock new features, new capabilities, and/or to resolve flaws, bugs, or other discrepancies that may exist. Often times however, the game content is stored in an encrypted form. By encrypting the game content, unauthorized modifications to the game content can be prevented. However, operations such as applying updates and/or patches performed upon the encrypted game content are generally limited because the update and/or patches are being applied to encrypted file contents. Similarly, operations such as applying updates and/or patches to an operating system image and/or packages of raw data are generally limited because the update and/or patches are being applied to encrypted filed contents.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods that provide the ability to update encrypted image files utilizing encrypted data in a content update package. More specifically, a first version of software may reside at a first client device; a second gold standard version may reside at a content provider. The differences between the first version and the second version may be assembled in a content update package. The content update package may be provided to a client device, such as a game console. The game console may decrypt the content update package as well as the game content corresponding to the first version and residing at the console device utilizing a first operating system or secure processor which has the privileges and key material necessary to decrypt the data. The game console may then update the game content utilizing instructions and/or data in the content update package. The update process may occur at a second operating system of the game console. The updated content may then be encrypted again. Anti-tamper hashes may be generated based on the encrypted updated content; such hashes may be compared to hashes received in the content update package. If the hashes match, then the update process is completed once the encrypted updated content is associated with the game content.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
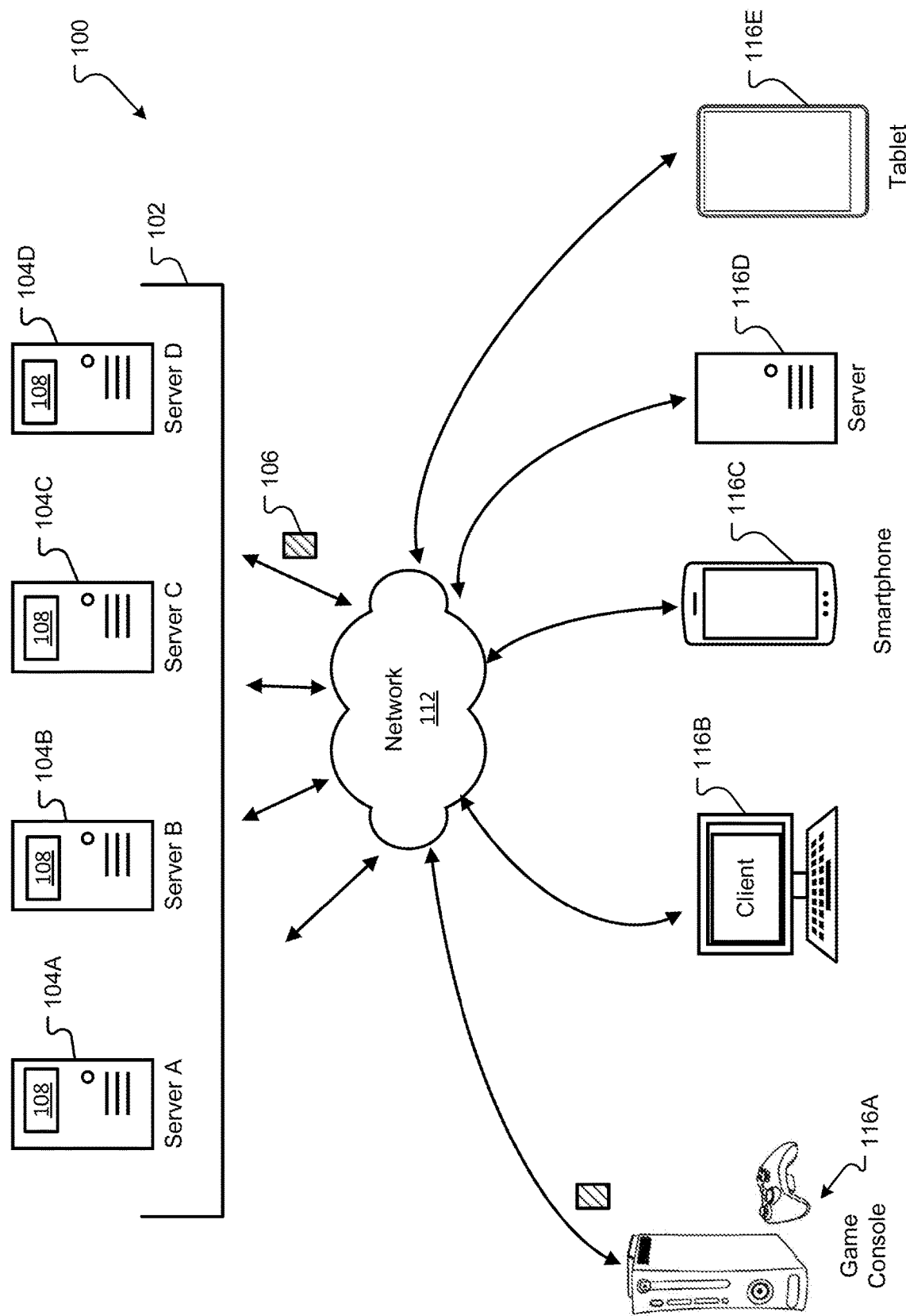
FIG. 1 illustrates details of a content update management system in accordance with examples of the present disclosure.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

As new content and capabilities of a software applications become available, an update management system may be tasked with bringing instances of software applications located in remote locations running non-current versions to a current status. As one non-limiting example, a software application at a first device may be a version behind the latest available software application. Accordingly, an update management system generally determines an update to be applied to the non-current software, provides the update to the device at which the non-current software is located, and then indicates to the device that the update is ready to be installed, thereby bringing the non-current software to a current status.

Similarly, in instances where content is located at a console, such as a game console or other device, updates to the game, or title, are often necessary to unlock new features, new capabilities, and/or to resolve flaws, bugs, or other discrepancies that may exist. In some instances, a game, or title, including all or part of a combination of binary executable and data files collected in a known container format, also known as a package, may be available and/or stored as a disk image. That is, a package may be distributed and/or stored in the form of a computer file containing the contents and the structure of a disk volume, where the disk volume, or logical construct, is generally a single accessible storage area with a single file system. The package may be distributed as a single file, for example via a download or via a storage medium. Often times the package is in an encrypted form and includes anti-tamper features such that one or more attack vectors are minimized. By encrypting the package and providing anti-tamper protection, unauthorized modifications to the package and/or package content, can be prevented. However, operations such as applying updates and/or patches performed upon the encrypted package are generally limited because the update and/or patches are being applied to encrypted filed contents.

Previous solutions that applied encrypted updates to encrypted packages treated each package as a series of blocks, or chunks, which are added or removed in the updated package. As block boundaries are well known, the new block was encrypted with a known key and then spliced into the package. However, tiny changes in a large, multi-gigabyte block can lead to an entire block having to be redistributed via a download or some other means. Moreover, such a procedure does not allow for reduced redundancy or allow for transparent data compression, as operations are always performed on the encrypted data, which is effectively random and incompressible. Other solutions invoked encrypted updates and/or patches at a file level and utilized smaller blocks; however, such solutions still failed to address reduced redundancy and/or compressibility issues as previously discussed. Moreover, in updating smaller blocks, such small blocks may not align with the way package authors create content; as such changes may not occur at such boundaries and generating and providing such update may lead to additional time and expense.

In accordance with examples of the present disclosure, encrypted content may be applied as a patch and/or update to an existing package utilizing decryption and encryption mechanisms found at the destination device. For example, a content update management system 100, as illustrated in FIG. 1, may generally include one or more content and/or update providers 102; the content and/or update providers 102 may include one or more servers 104A-104D. Each of the servers 104A-104D may include a content generator 108 configured to generate one or more patches and/or updates for a system requesting the updated content. In some examples, the content generator 108 may compare a prior version of content, such as a title, to a later version of the content, such as an updated title. Alternatively, or in addition, the later version of the content, such as the title, may be compared to the prior version of the content, or title. Based on this comparison, one or more packages may be generated, where the one or more packages include the necessary content and appropriate anti-tamper mechanisms to update a prior version of the content to a latest, or later version. As one example, a prior version may be labeled game_title version 1.2. The later version may be labeled game_title version 1.3. The content generator may compare game_title version 1.2 and game title version 1.3 and determine the differences. The differences between the two versions may correspond to one or more files that have been changed, one or more data blocks that have been changed, one or more anti-tamper hashes that have been changed, and/or any other differences in content between the two versions. In some examples, the difference may correspond or otherwise include anti-tamper hashes and/or and updated security keys for instance.

As another example, the content generator 108 may determine differences between a latest version of the title and one or more previous versions of the title stored at the content and/or update providers 102. For instance, multiple versions of the game title, for instance, game_title 1.1 to game_title 3.2, may be stored, maintained, or otherwise available for distribution from the content and/or update providers 102 and/or other distribution means, such as DVD and/or CD for instance. Thus, the content generator 108 may compare the latest version, also referred to as a gold standard version, to the earlier version to generate a package corresponding to each earlier version, where the pack corresponding to each earlier version includes the necessary content to apply the update to the earlier version thereby resulting in the latest, or gold standard version. Accordingly, one or more of the content and/or update providers 102 may include or otherwise maintain multiple content packages. In some examples, each content package may be referred to as a hop package.

In accordance with examples of the present disclosure, the update package, or hop package, may be transmitted as an update package 106 via the network 112 to one or more endpoints 116A-116E. The update package 106 may be streamed piecewise on-demand as portions of it are needed by the client or user devices 116A-116E, cached locally in whole or part, or downloaded as a whole entity to the user deice 116A-116E. The update package may also be stored on a variety of server locations such as a Content Delivery Network (CDN), and then retrieved by the client system (116A-E). Accordingly, one or more user devices 116A-116E receive the update package 106. In some examples, the user device 116A-116E may correspond to a game console 116A, a client device 116B, a smartphone 116C, and/or a tablet 116E. In some instances, the endpoint may correspond to a server 116D; the server 116D may run a session or otherwise have a need for an updated content package. As another non-limiting example, at least one computing device 116A-116E may be any device configured to allow a user to use an application such as, for example, a smartphone, a tablet computer, a desktop computer, laptop computer device, gaming devices, media devices, smart televisions, multimedia cable/television boxes, smart phone accessory devices, industrial machinery, home appliances, thermostats, tablet accessory devices, personal digital assistants (PDAs), or other Internet of Things (IOT) devices.

Figure 2:
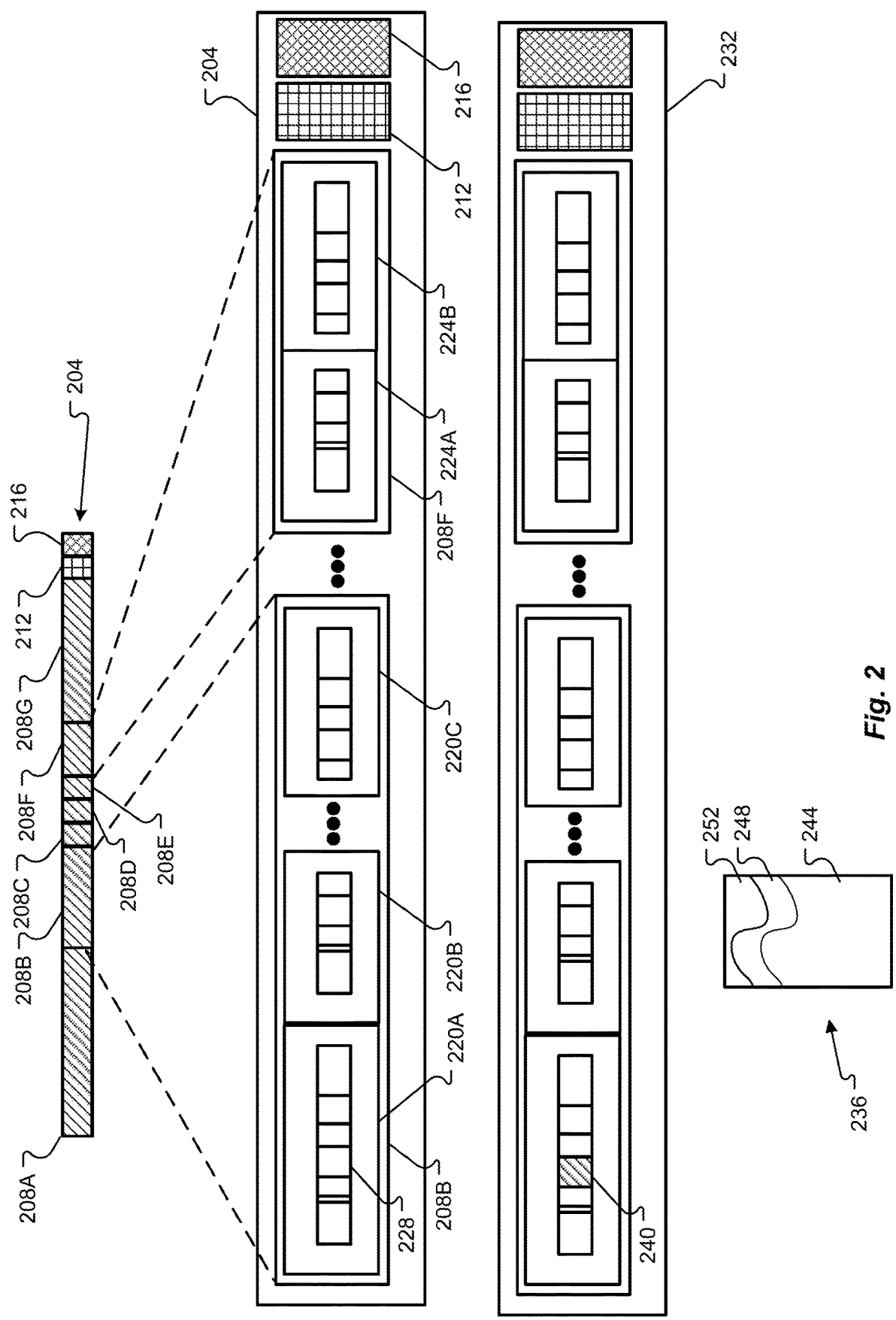
FIG. 2 depicts additional details of a game title in accordance with examples of the present disclosure.

FIG. 2 depicts additional details of a title in accordance with examples of the present disclosure. The title may correspond to or otherwise be in the form of an image 204 as previously discussed. The image 204 may include various data portions 208A-208G for example. Each data portion may correspond to data that is a part, or portion, of a title. For example, if all contents of a game were included in the image 204, the image 204 may include a graphics area 208A, where one or more images or textures may be stored, a sound area 208B, where one or more sounds and/or sound files may be stored, one or more game support files 208C, where one or more files supporting the installation and execution of the title, maybe stored. In addition, the image 204 may include other data portions 208D-G, or contain fewer data portions. One or more areas of the 20A-208G may be encrypted utilizing one or more encryption keys maintained or otherwise controlled by an entitlement management system. The one or more encryption keys may correspond to a specific location 208A-208G, or otherwise correspond to the image 204 generally. In addition, the image 204 may include one or more anti-tamper protection regions 212; the anti-tamper protection regions may include a plurality of anti-tamper hashes corresponding to various parts and/or portions of the image 204. The anti-tamper hashes may be generated based on one or more of the data portions 208A-G and may be stored within the image 204. The inclusion of the anti-tamper hashes in the image 204 may be utilized to provide an indication if one or more data portions 208A-208G have been modified, either in a malicious manner or by data transmission and/or storage errors.

The anti-tamper protection regions 212 are generally utilized to ensure that the data portions 208A-208G have not changed. For example, an anti-tamper hash may correspond to a specific or variable size of data, filed, and/or location, within the image 204. Such anti-tamper hashes may be created ahead of time and stored with the data portions 208A-208G and/or anti-tamper protection regions 212 as a Merkel tree for example. Should the data in one or more of the data portions 208A-208G change at some point in the lifespan of the image 204, a newly generated anti-tamper hash for the changed data would not match the anti-tamper hash stored in the anti-tamper protection region 212. The image 204 may also include a metadata portion 216. The metadata portion 216 may include a master file table and include data that describes the image 204. For example, the metadata portion 216 may include data that describes which files are included in the image 204, where one or more files within the image 204 are be located, and/or other information about the image 204.

As further indicated in FIG. 2, a data portion 208B may be logically divided or otherwise divided into one or more file portions 220A-220C. Each data portion 208A-208G, may include a different number of file portion 220A-220C for example. Further, each file portion 220A-220B may include one or more data blocks 228. Each data block may be of a specific or predefined size. Alternatively, or in addition, a size of each data block may be different from another data block. As further depicted in FIG. 2, the data portion 208F may include file portions 224A-224B.

In accordance with examples of the present disclosure, a gold standard image may correspond to the depicted image 204. A gold standard image may generally correspond to the newest version of a title. An image 232 may correspond to a previous non-updated or non-current version of the title. That is, the image 204 may correspond to game_version 3.4 for example, whereas the image 232 may correspond to the game_version 3.2 for example. Accordingly, differences between the image 204 and image 232 may be determined and may be packaged as a hop file 236 for distribution to one or more endpoints 116A-116E as previously discussed. For example, the data block 228 may be different from the data block 240; accordingly, the new data block 244, representing the differences between the data block 228 and 240 may be generated. Alternatively, or in addition, the data block 244 may correspond to the data block 228 such that data block 244 represents a replacement data block.

In some examples, since the data block 228 is different from the data block 240, anti-tamper hashes 248 may be required to verify that the updated data block 244 is from the gold standard image 204. That is, a new anti-tamper hash based on the data block 244 must match an anti-tamper hash included in the anti-tamper hash portion 248. Alternatively, or in addition, a new anti-tamper hash based on the data block 244 must match an anti-tamper hash generated from hash information located in the anti-tamper hash portion 248. When the anti-tamper hashes match, the data block generated from the hop file 236 may be the same as the data block of the gold standard image 204.

The anti-tamper hashes for different data blocks and/or files may be provided. In some instances, a portion of or the entire anti-tamper hash portion 212 may be provided as anti-tamper portion 248; this is because some anti-tamper hashes may rely upon previous anti-tamper hashes. In addition, since metadata associated with the block portion 228 may have changed, the hop or update package 236 may include the changed metadata. In some instances, the entire metadata portion 216 may be provided as or otherwise included in the metadata portion 252. The data content 244, anti-tamper hashes 248, and metadata 252 may be provided as one or more hop packages. In some instances, the data content 244, anti-tamper hashes 248, and metadata 252 may be provided in multiple hop packages such that an update process may occur over time. As previously discussed, the content generator 108 may be responsible for generating the hop package 236, or portion of the hop package 236.

Figure 3:
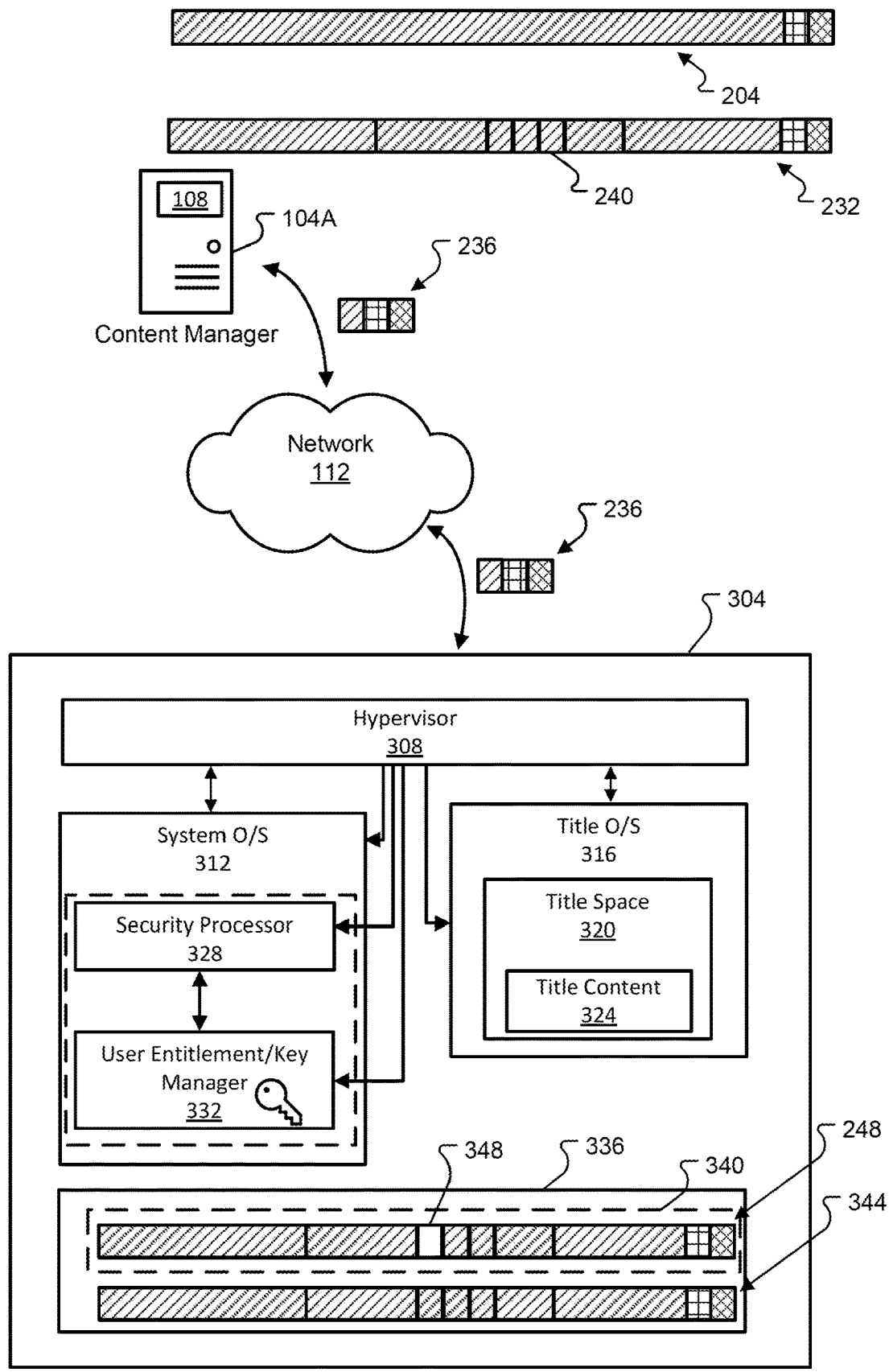
FIG. 3 depicts additional details of a content distribution process in accordance with examples of the present disclosure.

FIG. 3 depicts additional details of a content distribution process in accordance with examples of the present disclosure. As previously discussed, the content and/or update provider 102 may include a server 104A including a content generator 108; the content generator 108 may compare a gold standard version of title content 204, for example, to a prior release or otherwise previous version 232 to generate a hop package 236 for example. The hop package 236 may include data required to update the previous version 232 to the gold standard title content 204 version. As previously discussed, the hop package 236 may include data, anti-tamper hashes, and/or metadata. The hop package 236 may be distributed to an endpoint device 116A-116E, 304 via the network 112. The endpoint device 304 may correspond to a game console for instance and may be the same as or similar to one or more of the endpoints 116A-116E previously discussed.

The endpoint 304 may include a hypervisor portion 308, a system operating system 312 and a title operating system 316. The hypervisor portion 308 may be software, firmware or hardware that creates and/or runs virtual machines, or an operating system in a virtual environment. That is, a hypervisor portion 308 may provide an environment for one or more operating systems to execute. The hypervisor portion 308 may coordinate access to one or more system resources, such as a storage location 336, one or more processors, one or more communication interfaces, memory, and the like.

The title operating system 316 may be provided as a space or location for the title to install and execute. For example, the title operating system 316 may include title space 320 and title content 324. The title space 320 may be space require for the title to execute and store data, generated content, or otherwise. The title content 324 may correspond to the content of the gold standard package image 204 for example.

The system operating system 312 may coordinate the interaction of the title operating system 316 with other portions of the endpoint 116A for example. For example, the system operating system 312 may include a security processor 328 that is configured to decrypt the title content 324 and the content in the update package 236. Alternatively, or in addition, the security processor 328 may reside outside of or otherwise external to the system operating system 312 such that the security processor 328 is a separate entity and communicated to by the system operating system 312. Moreover, the system operating system 328 may facilitate the user entitlement processes such that the correct decryption keys for decrypting the title content 324 and the hop package 236 are obtained. Such keys may be associated with a user account, such as when a user is signed into an account and has been properly verified and or authorized to access the tile and/or the update package. Alternatively, or in addition, the user entitlement/key manager 332 may obtain one or more keys from an external location associated with media, such as a DVD and/or CD for instance.

In accordance with examples of the present disclosure, the system operating system 312 may receive or otherwise access the update package (hop package) 236 via the hypervisor portion 308. The security processor may decrypt the update package 236 and provide the decrypted update package to the title operating system 316. The title operating system 316 may then determine one or more locations of the image for the title content 324 that requires updating based on information included in the update package 236. That is, the update package 236 may identify the files, file locations, blocks, and/or block locations that are to be updated. In some instances, the update package 236 may generally identify the data within the image of the title content 324 that is to be updated. Accordingly, the title operating system 316 may cause the security processor 328 to decrypt the portion of the image that needs to be updated such that the update package 236 and the portion of the image needing to be updated are both present in unencrypted form, such as clear text. The title operating system 316 may then replace, update, delete, add, or generate content based on the content in the update package 236 as instructed by the update package 236.

In accordance with examples of the present disclosure, the update package 236 and the image corresponding to the title content 324, or the portion of the image corresponding to the title content 324, may be loaded into or otherwise read into a storage location, such as storage location 336. The storage location 336 may be located at a hard drive, in memory, or a combination of the two. The title content 324, or a portion of the title content 324, may be loaded into the storage location 336 and may correspond to the image 340, where the image 340 includes a portion 348 to be modified by the update package 236. The security processor 328 may decrypt the portion 348 and the update package; the title operating system 316 may then update the portion 348 in accordance with instructions included in the update package 236. A new image, or portion of an image 344 including the updated content may be generated. Accordingly, when the title operating system 316 is finished updating the image 340, or a portion of the image 340, the title operating system 316 may instruct the security processor 328 to encrypt the newly updated portion with the appropriate security keys. In some instances, the encryption operation of the newly updated portion may occur while the data is still inside the system's memory, so that unencrypted data is never written to storage.

The title operating system 316 may then instruct the security processor 328 to verify that the encrypted portion matches the encrypted portion found in the gold standard image by generating an anti-tamper hash based on the updated encrypted portion and comparing the generated anti-tamper hash to a received anti-tamper hash from the update package 236. If the two anti-tamper hashes match, then the new anti-tamper hash may be stored at the anti-tamper location within the image 344 and the new encrypted portion and the corresponding anti-tamper hash may be written to the title content area 324. If the two anti-tamper hashes do not match, then then the update process may be performed again and/or the gold standard version of the image or a portion of the image may be downloaded and installed. While the security processor 328 and the user entitlement/key manager 332 are depicted as residing within the system operating system 312, it should be appreciated that such features may be located as part of the console 304 and may be entirely separate from the system operating system 312.

Figure 4:
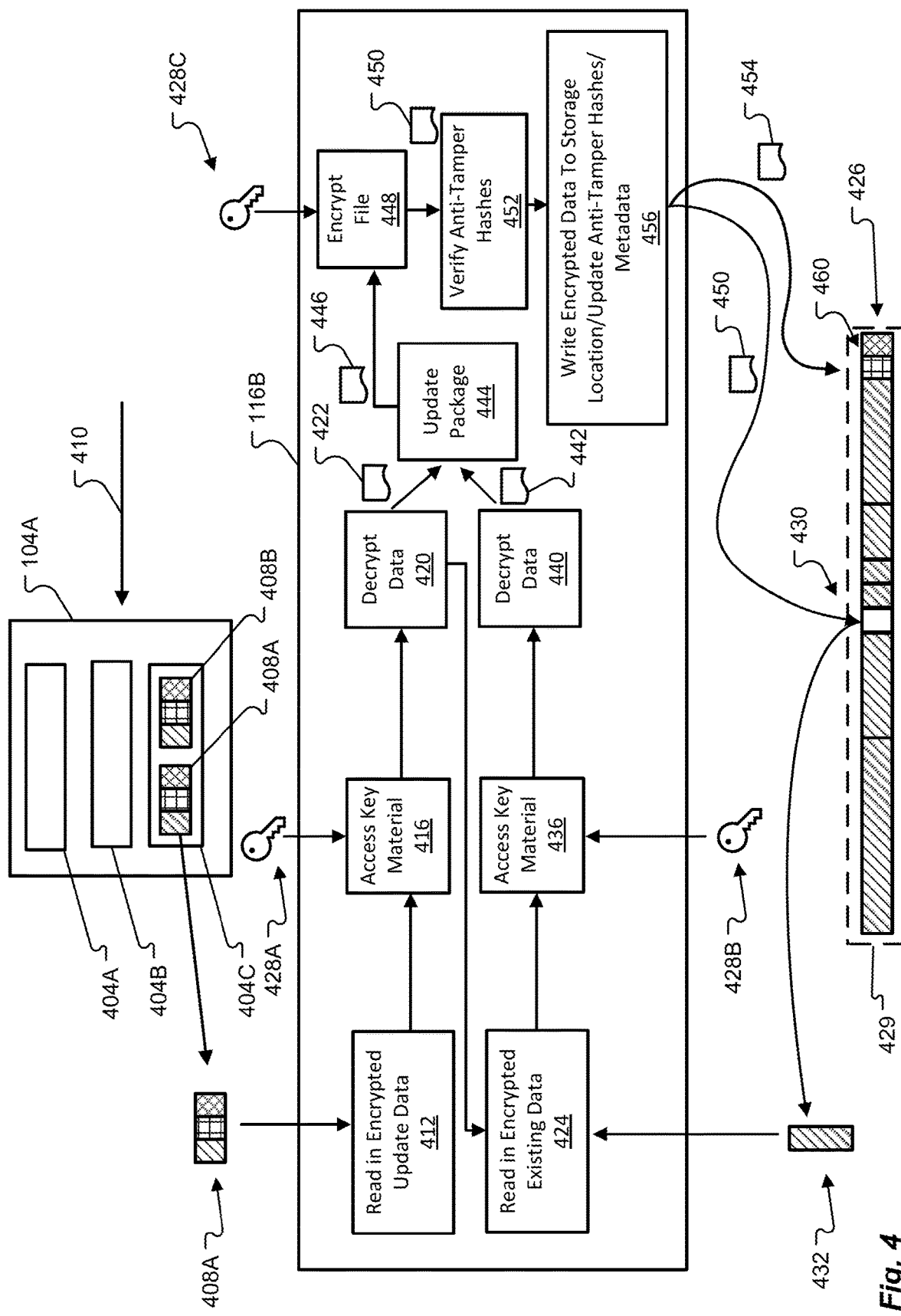
FIG. 4 depicts additional details related to updating and/or patching content in accordance with examples of the present disclosure.

FIG. 4 depicts additional details related to updating and/or patching content in accordance with examples of the present disclosure. In non-limiting examples, a content provider 104 may have access to or otherwise store one or more update packages 404A-404C. Each of the update packages may correspond to a previous version of content and may contain the changes necessary to apply to the previous version of content to make the previous version of content identical to the latest version of content. Moreover, each of the update packages 404A-404B may be partitioned into one or more update package portions 408A-408B for instance. The content provider may include more or less update packages than are illustrated in FIG. 4. In addition, each of the update packages may include more or less update package portions than are illustrated in FIG. 4. Each of the update packages 404A-404C may be encrypted in accordance with a key 428A.

An indication 410 may be received at a server 104A of the content and/or update provider 102; the indication 410 may indicate a specific version of content installed or otherwise located at an endpoint 116B. The indication 410 may be received directly from the endpoint 116B or may be received via another service or device. The content and/or update provider 102, upon receiving the indication 410, may locate an update package 404C for example, and send one or more update package portions 408A-408B of the update package 404C to the end point 116B. Upon receiving the update package portion 408A, the endpoint 116B may read in the encrypted data of the update package portion 408A utilizing a communication interface at 412. The endpoint 116B may access the key material 428A at 416; the key material 428A generally allows the endpoint 116B to decrypt the encrypted data from the update package portion 408A. At 420, the endpoint may decrypt the update package portion resulting in the decrypted update package portion 422. As previously discussed, the update package portion 408A may include location and identification information identifying which file metadata, files, data portions, blocks, or otherwise of the image located at the endpoint 116B are to be updated, deleted, or created by the update package portion 408A.

Accordingly, the encrypted data in the update package portion 408A is processed into decrypted data 422. Based on the information in the update package portion 408A, the endpoint 116B may determine which portions of the installed title, for example installed title 426, are to be updated. For example, portion 430 of the title 426 may need to be updated. In some instances, this determination is made on clear text information included in the update package portion 408A. Alternatively, or in addition, this determination is made based on decrypted data 422 from the update package portion 408A. The decryption of the update package portion 408A may occur at the security processor 328, system operating system 312, and/or within the title operating system 316.

The installed title 426 may reside at a memory location 429 as title content 324; the memory location 429 may correspond to a location within the title operating system 316 and/or title space 320. In non-limiting examples, the memory location 429 may correspond to any storage location accessible by the endpoint 116B. The endpoint 116B may read in the encrypted existing data portion 424. The endpoint 116B may receive, at 436, the access key material 428B to decrypt the portion 432 resulting in the decrypted data 442 at 440. Key material 428B may be the same as or different from key material 428A. For example, the key material 428B may allow a user to execute a title, while the key material 428A may allow a user to update the title. The portion 432 is then decrypted at 440 resulting in decrypted data 442. The decryption of the portion 432 may occur at the security processor 432, system operating system 312, and/or within the title operating system 316.

Once the portion 432 is decrypted into decrypted data 442, the decrypted data 442 is acted upon by the information in the decrypted update package portion 422 at 444. For example, one or more files, one or more blocks, one or more pieces of data may be changed, modified, added, and/or deleted. Alternatively, or in addition, other forms of processing may be applied to the data at this step, such as but not limited to data compression or decompression. The result of the update process at 444 may result in an updated content portion 446. The updated content portion 446 may then be encrypted at 448 utilizing the key material 428C resulting in the encrypted updated content portion 450. The key material 428C may be the same or different from each of key material 428A and/or 428B. At 452, one or more anti-tamper hashes of the encrypted updated content portion 450 may be generated. The generation of the one or more anti-tamper hashes may be based upon data in the updated package portion 408A and/or as indicated by one or more portions of the title 426. The one or more generated anti-tamper hashes may then be compared to an anti-tamper hash of the gold standard version at 452. The anti-tamper hash of the gold standard version may be provided separate from the update package portion 408A such that a server 104A of the content and/or update provider 102 provides anti-tamper hashes of the gold standard version directly to the endpoint 116B for example. Alternatively, or in addition, the anti-tamper hashes of the gold standard version may be included in the update package portion 408A. If the two anti-tamper hashes match, then the updated content portion 446 and/or the encrypted updated content portion 450 is determined to be good, or updated, and the encrypted updated content portion 450 and the generated anti-tamper hash or anti-tamper hash from the update package portion 408A is written to the title content 426 at 456.

Stated another way, the update package 408A includes its own hashes to verify that its data is not tampered with. The package, or title 426, which already exists on the system (the "old" package) has its own hashes to verify that its data is not tampered with. The gold standard hashes also exist within the update package 408A, and are used to verify that once the old package has been updated to be equivalent to the gold standard by applying the update package 408A to it, the hashes of the updated package, or updated title 426, match the gold standard package's hashes identically.

The metadata of the title content 426 may be updated based on the update package portion 408A and/or encrypted updated content portion 450. As depicted in FIG. 4, the encrypted updated content portion 450 may be written to the location corresponding to location 430. Similarly, the anti-tamper hashes 454 may be written to the anti-tamper hash area 430.

The encryption of the updated content portion 446 at 448 may occur at the system operating system 312 and/or the security processor 328. In some instances, the encryption of the updated content portion 446 may occur at the title operating system 316. The verification of the anti-tamper hashes at 452 may occur at the system operating system 312 and/or the security processor 328. In some instances, the verification of the anti-tamper hashes at 452 may occur at the title operating system 316. The writing of the encrypted updated content portion 450 may occur at the system operating system 312 and/or the security processor 328. In some instances, the writing of the encrypted updated content portion 450 may occur at the title operating system 316.

In instances where the anti-tamper hashes do not match at 452, the content update process depicted in FIG. 4 may be executed again. Alternatively, or in addition, portions of the gold standard version where the anti-tamper hashes don't match the gold standard version's anti-tamper hashes will be downloaded from the server and applied to the updated package (the data is copied directly). The hashes are then validated again. Accordingly, a fallback and repair process may be executed allowing the repair of updates without resorting to downloading the entire gold standard version such that only a minimal amount of data needed to repair a hash tree and make the updated data match the gold standard version's data are needed. Alternatively, or in addition, the entire gold standard version residing at the content provider 102 may be downloaded. For example, the title operating system 316 may request the gold standard version image from the one or more update and/or content providers 102.

Figure 5:
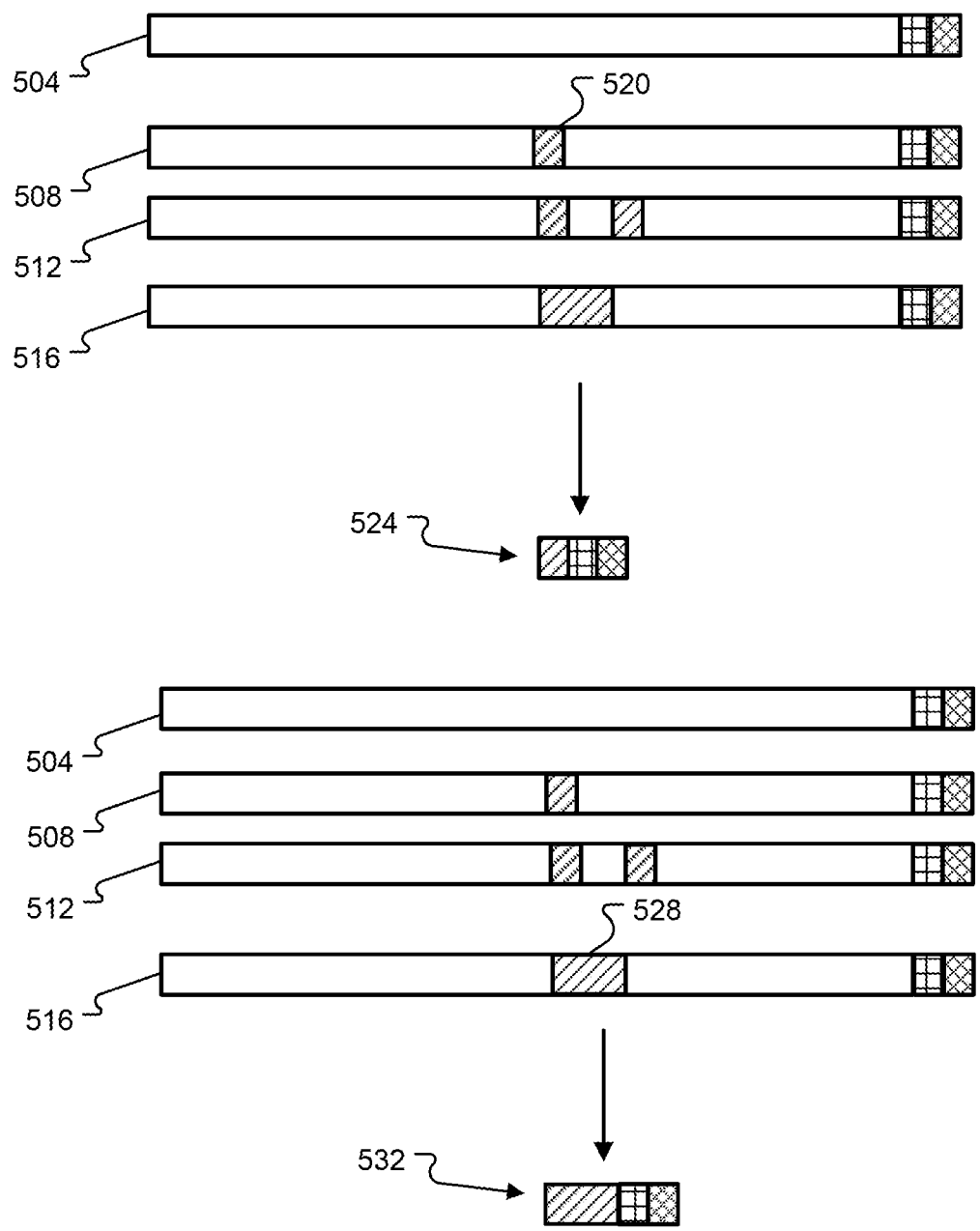
FIG. 5 depicts additional details of hop package creation, also referred to herein as a content update package creation process in accordance with examples of the present disclosure.

FIG. 5 depicts additional details of hop package creation, also referred to herein as a content update package creation process. As depicted in FIG. 5, an update and/or content provider 102 may store or otherwise have access to a gold standard image 504, and various previous version images 508, 512, and 516. For each of the various previous version images 508, 512, and 516, a content update package may be created. For example, a content generator 108 may compare the gold standard image 504 to the previous version image 508. The differences between these two versions corresponds to data portion 520. Accordingly, a content update package 524 may be generated by the content generator 108 and include the difference data and/or instructions for making the previous version image 508 the same as or at least similar to the gold standard image 504. As another example, a content generator 108 may compare the gold standard image 504 to the previous version image 516. The differences between these two versions corresponds to data portion 528. Accordingly, a content update package 532 may be generated by the content generator 108 and include the difference data and/or instructions for making the previous version image 516 the same as or at least similar to the gold standard image 504. Accordingly, when the update and/or content provider 102 receives an indication indicating that the client device 116B has a specific previous version image, such as previous version image 508, the update and/or content provider 102 can provide the corresponding content update package 524 to the client device 116B.

Figure 6A:
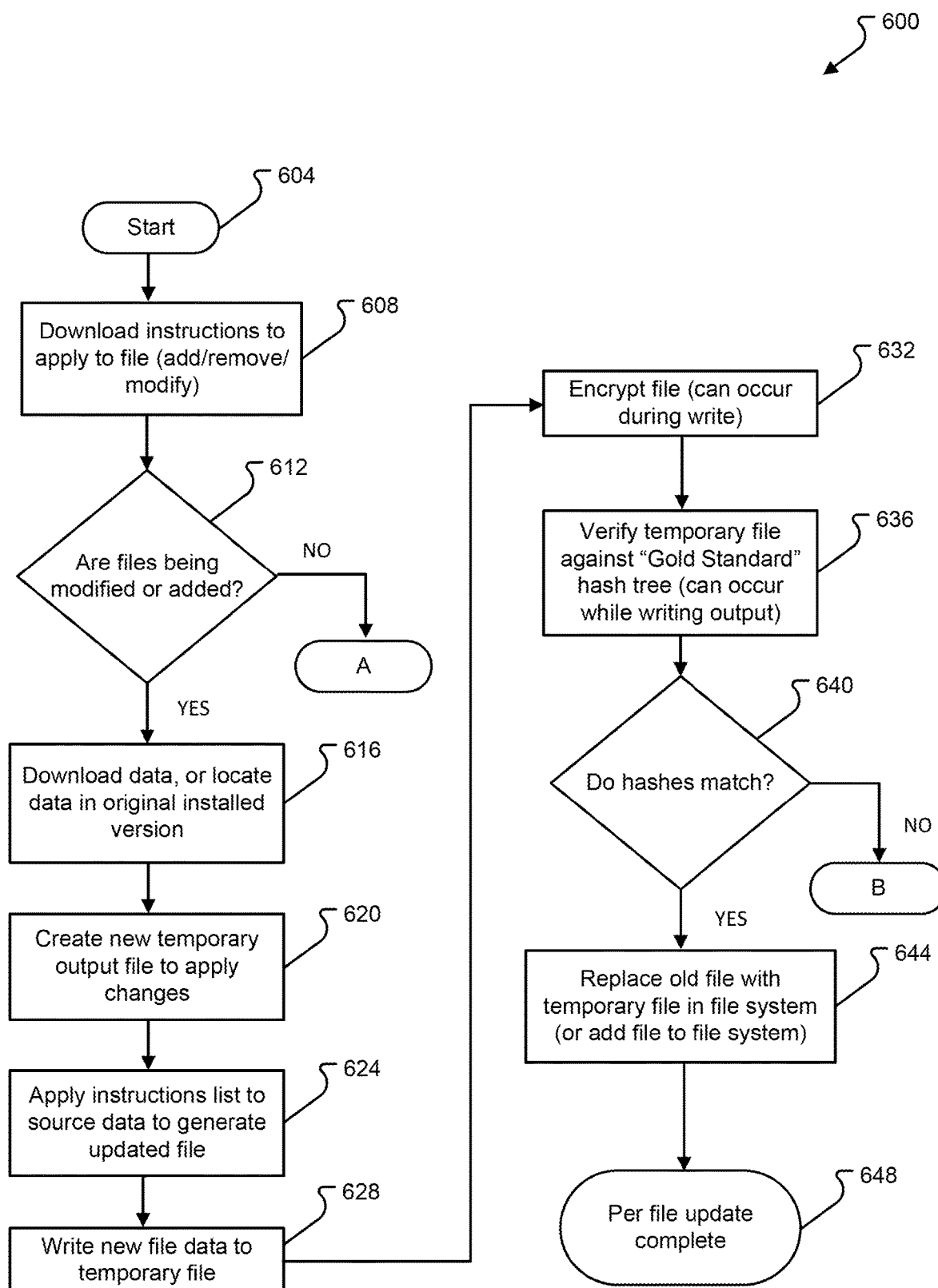
FIGS. 6A and 6B depict details of a method for updating and/or patching encrypted data generally located at a client device.
Figure 6B:
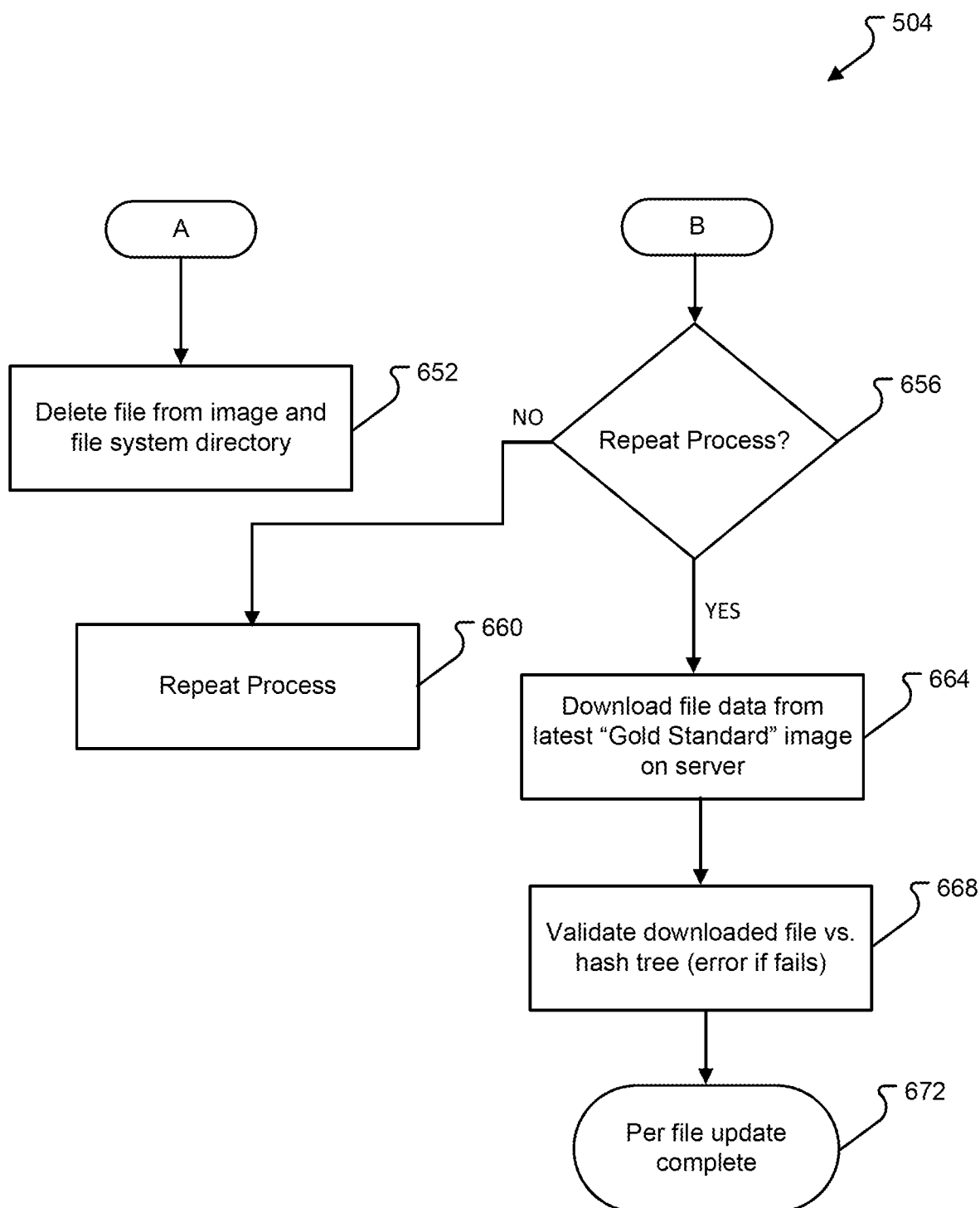

FIGS. 6A and 6B depict details of a method 600 for updating and/or patching encrypted data generally located at a client device. A general order for the steps of the method 600 is shown in FIGS. 6A and 6B. Generally, the method 600 starts with a start operation 604 and ends with the file update process being completed at 648. The method 600 can include more or fewer steps or can arrange the order of the steps differently than those shown in FIGS. 6A & 6B. The method 600 can be executed as a set of computer-executable instructions executed by a computer system and encoded or stored on a computer readable medium. Further, the method 600 can be performed by gates or circuits associated with a processor, Application Specific Integrated Circuit (ASIC), a field programmable gate array (FPGA), a system on chip (SOC), or other hardware device. Hereinafter, the method 600 shall be explained with reference to the systems, components, modules, software, data structures, user interfaces, etc. described in conjunction with FIGS. 1-5.

The method 600 starts by downloading or otherwise receiving instructions to be applied to a file existing at a client device at step 608. For example, a client device, such as the client device 116B, may receive a content update package including instructions to modify an encrypted portion of a file, block, or other form of data. If a portion of a file, block, or the other form of data is being modified or added at 612, the method 600 may proceed to step 616 where additional data may be downloaded in another content update package. Alternatively, or in addition, the initial content update package may include the necessary data to perform the update and/or patch. Further, the file, block, or other form of data existing at the client device may be located as source data and a new temporary output file may be created at step 620. The temporary output file may reside in the title operating system for example and may include the source data. At step 624, the list of instruction received in the content update package may be applied to the source data to generate an updated file and this new file data may be written as a new temporary file at step 628. At step 632, the new temporary file data may be encrypted, which may be performed during a write operation for instance. The newly encrypted file may be compared to the gold standard image at step 636 by generating an anti-tamper hash for the newly encrypted portion and comparing the generated anti-tamper hashes to gold standard version anti-tamper hashes received directly from a content and/or update provider 102 for example. Alternatively, or in addition, the anti-tamper hashes of the gold standard version may be provided in the content update package. If the gold standard image anti-tamper hashes match at step 640, the method 600 may proceed to step 644 where the source data may be replaced with the newly encrypted file. In instances where a file or other content is being added, the new content may be added to the file, block, or other form of data existing at the client device. In addition, updated anti-tamper hashes and updated metadata, such as file system directory contents, may be added to the anti-tamper hash portion of the image. Once the old, or original, content has been replaced, the per file, or per block, update may be considered complete.

In accordance with aspects of the present disclosure, when instructions in a content update package indicate that a file is not being added or modified, but is being deleted instead, for example at step 612, the method 600 may proceed to step 652, where based on the received instructions in the content update package, the file or block may be deleted from the image and from the file system directory. The method 600 may then end at step 652, where the per file/per block update process is complete in accordance with files having been deleted from the image. In accordance with aspects of the present disclosure, if the anti-tamper hashes do not match at step 640, the method 600 may proceed to step 656, where it may be determined if the content update process should be repeated; that is, the method 600 may proceed to step 660 where the method 600 returns to step 604. In instances where the content update process should not be repeated, but the operation has failed at step 640, the method 600 may proceed to step 664 where portions of the whole of the gold standard image is downloaded or otherwise received from the content provider. At step 668, anti-tamper hashes may be generated based on the updated image and if the generated anti-tamper hashes match the anti-tamper hashes included in the gold standard image, then the method 600 may proceed to step 672 where the content update process is considered to be complete.

Figure 7:
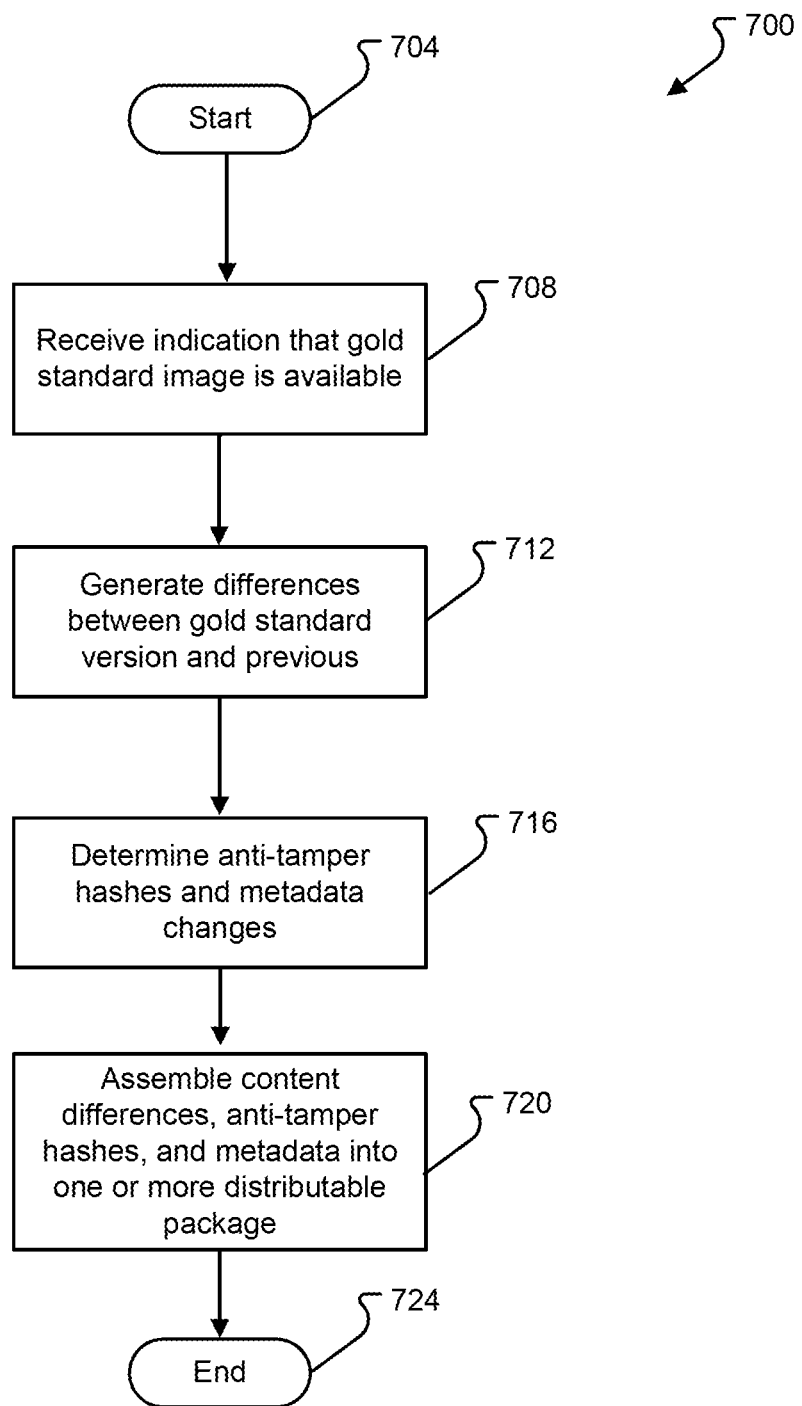
FIG. 7 depicts details of a method for generating a content update package, also referred to as a hop package.

FIG. 7 depicts details of a method 700 for generating a content update package, also referred to as a hop package. A general order for the steps of the method 700 is shown in FIG. 7. Generally, the method 700 starts with a start operation 704 and ends with the end operation 724. The method 700 can include more or fewer steps or can arrange the order of the steps differently than those shown in FIG. 7. The method 700 can be executed as a set of computer-executable instructions executed by a computer system or cluster of network computer systems and encoded or stored on a computer readable medium. Further, the method 700 can be performed by gates or circuits associated with a processor, Application Specific Integrated Circuit (ASIC), a field programmable gate array (FPGA), a system on chip (SOC), or other hardware device. Hereinafter, the method 700 shall be explained with reference to the systems, components, modules, software, data structures, user interfaces, etc. described in conjunction with FIGS. 1-6B.

The method 700 starts at 704 and may be initiated by determining there is a need to generate a content update package. For example, an indication indicating that a gold standard package is available may be received at step 708. In some instances, the gold standard image may be a newly created and/or newly released gold standard image. At step 712, differences between the gold standard image and a previous version may be generated. At step 716, anti-tamper hashes and metadata may be generated, or they may be generated in parallel with this operation; the anti-tamper hashes, metadata, and differences between the gold standard image and the previous version may be assembled into one or more content update packages, or otherwise known as a distributable package, at step 720. The method 700 may then end at step 724.

Figure 8:
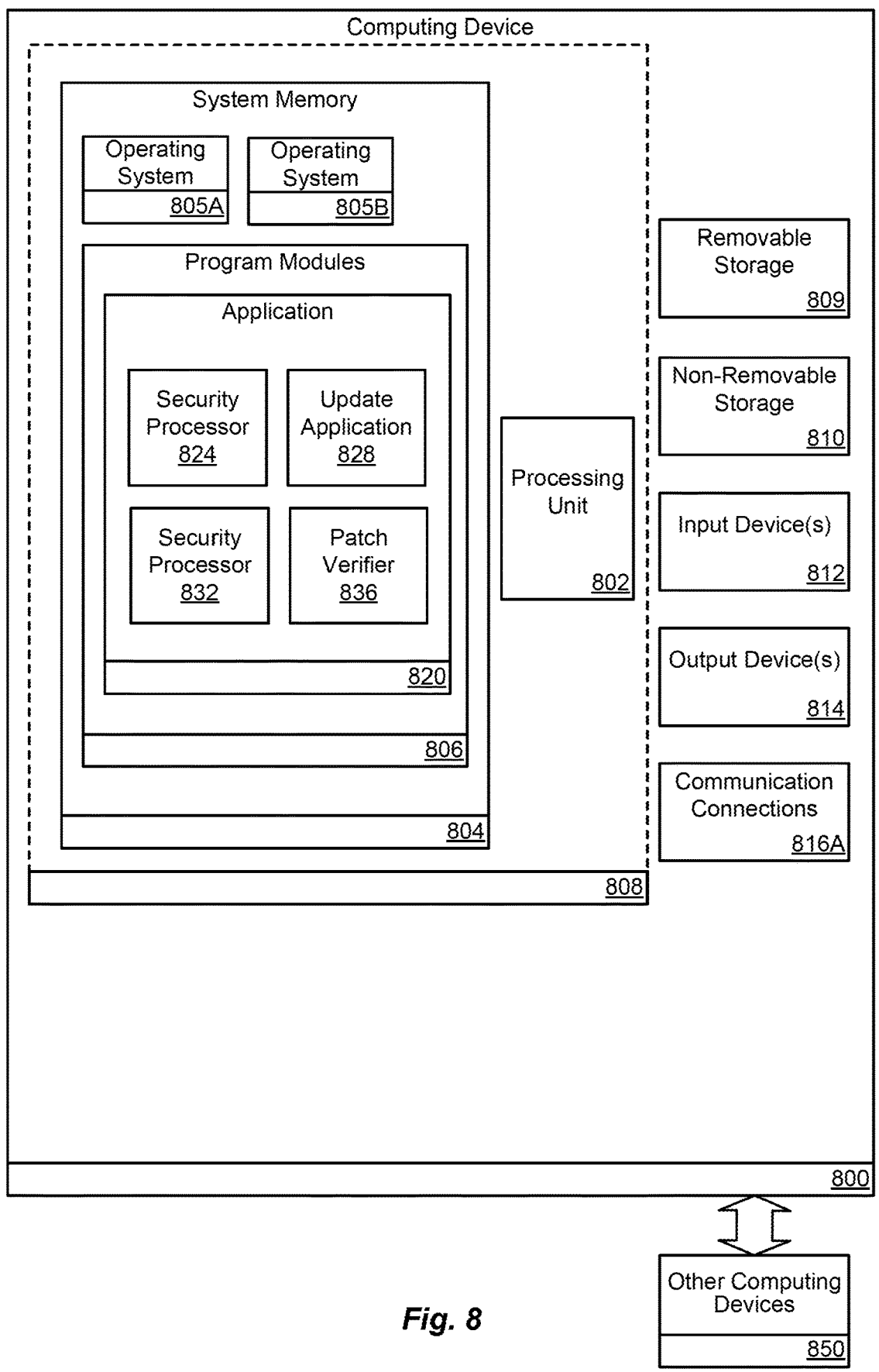
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may be suitable for the computing devices, such as one or more client devices 116A-E, described above. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805A and 805B and one or more program modules 806 suitable for performing the various aspects disclosed herein such as the security processor 824, security processor 832, an update application 828, and/or a patch verifier 836. These modules and/or operations may be performed in series, parallel, or multiplexed between components as they are being performed, as long as the results remain the same at the end of the process as performing them serially. The operating system 805A, for example, may be suitable for controlling the operation of the computing device 800. The operating system 805B, for example, may be suitable for controlling game and/or title execution. Furthermore, aspects of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804, the removable storage device 809, and/or the non-removable storage device 810. While executing on the processing unit 802, the program modules 806 (e.g., application 820) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 800 may also have one or more input device(s) 812 such as a keyboard, a mouse, a pen, a sound or voice input device, a touch or swipe input device, a gamepad, or joystick, etc. The output device(s) 814 such as a display, speakers, a printer, etc. may also be included. The aforementioned devices are examples and others may be used. The computing device 800 may include one or more communication connections 816A allowing communications with other computing devices 850. Examples of suitable communication connections 816A include, but are not limited to, radio frequency (RF) transmitter, receiver, and/or transceiver circuitry; universal serial bus (USB), parallel, network interface card, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9A:
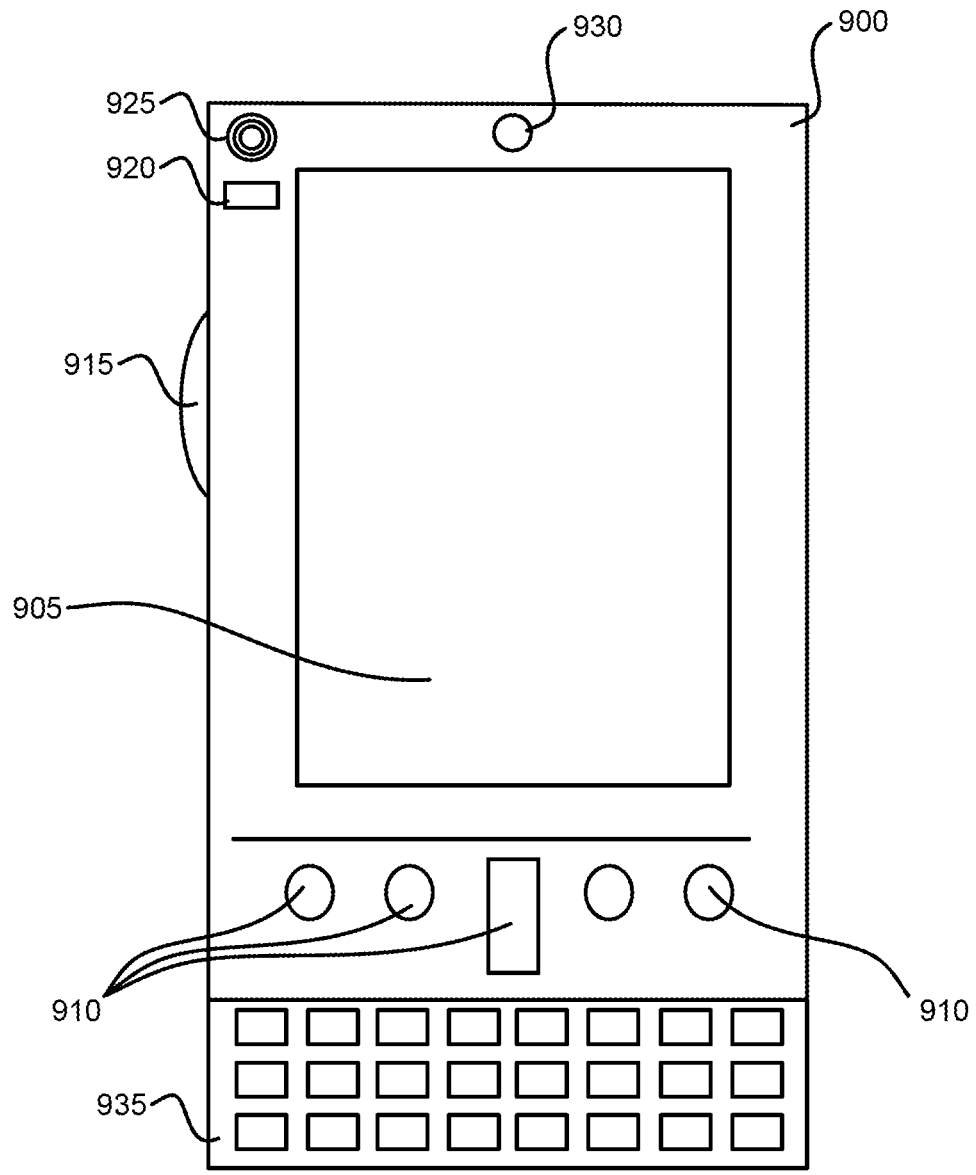
FIG. 9A is a simplified block diagram of a computing device with which aspects of the present disclosure may be practiced.
Figure 9B:
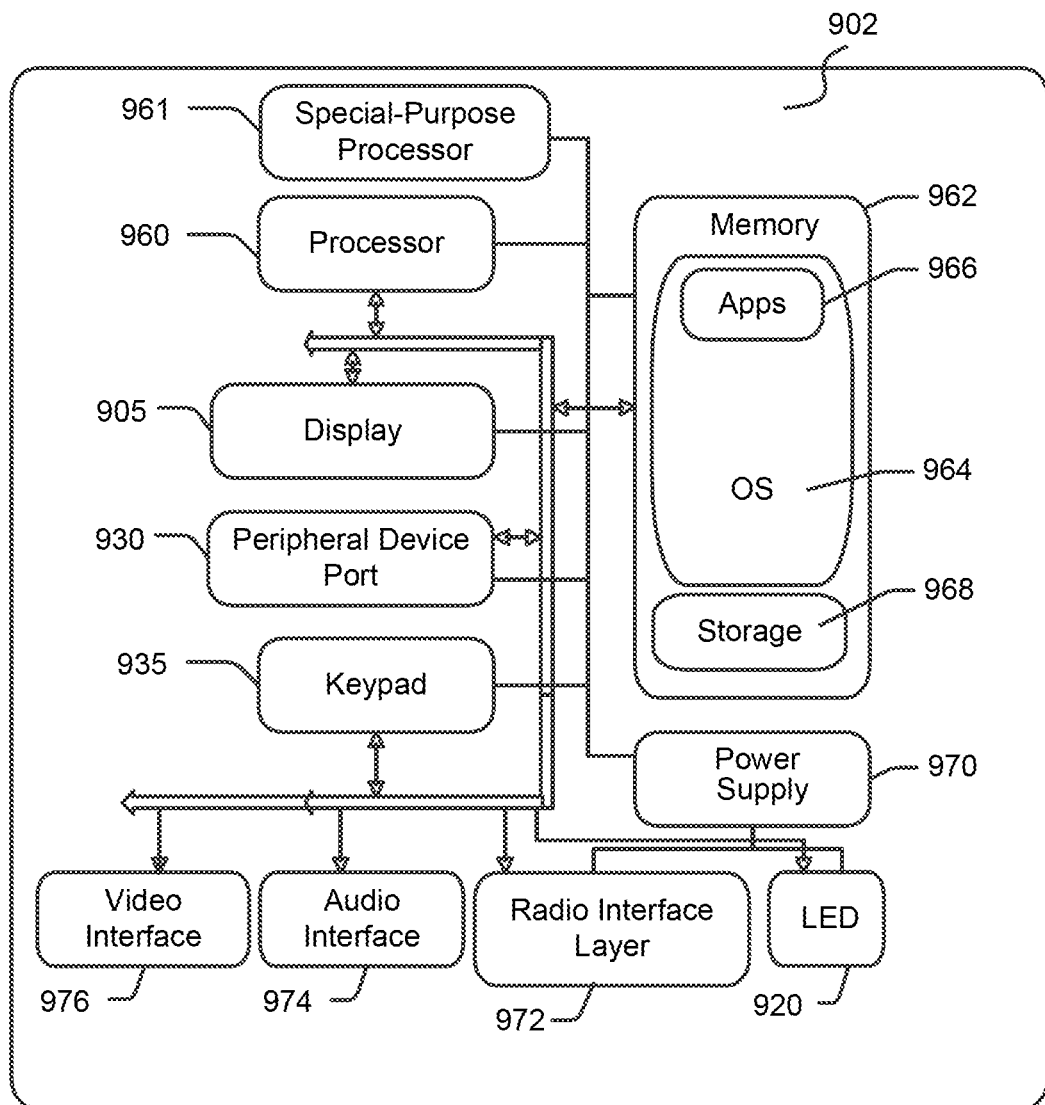
FIG. 9B is another are simplified block diagram of a mobile computing device with which aspects of the present disclosure may be practiced.

FIGS. 9A and 9B illustrate a computing device, client device, or mobile computing device 900, for example, a mobile telephone, a smart phone, wearable computer (such as a smart watch), a tablet computer, a laptop computer, and the like, with which aspects of the disclosure may be practiced. In some aspects, the client (e.g., computing system 116A-116E) may be a mobile computing device. With reference to FIG. 9A, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative aspects, mobile computing device 900 may incorporate more or less input elements. For example, the display 905 may not be a touch screen in some aspects. In yet another alternative aspect, the mobile computing device 900 is a portable phone system, such as a cellular phone. The mobile computing device 900 may also include an optional keypad 935. Optional keypad 935 may be a physical keypad or a "soft" keypad generated on the touch screen display. In various aspects, the output elements include the display 905 for showing a graphical user interface (GUI), a visual indicator 920 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external source.

FIG. 9B is a block diagram illustrating the architecture of one aspect of computing device, a server (e.g., server 104A-104D), or a mobile computing device. That is, the computing device 900 can incorporate a system (e.g., an architecture) 902 to implement some aspects. The system 902 can implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, title content, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900 described herein (e.g., search engine, extractor module, relevancy ranking module, answer scoring module, etc.).

The system 902 has a power supply 970, which may be implemented as one or more batteries. The power supply 970 might further include an external power source, such as an AC adapter or a powered docking cradle that supplements or recharges the batteries.

The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the operating system 964, and vice versa.

The visual indicator 920 may be used to provide visual notifications, and/or an audio interface 974 may be used for producing audible notifications via the audio transducer 925. In the illustrated configuration, the visual indicator 920 is a light emitting diode (LED) and the audio transducer 925 is a speaker. These devices may be directly coupled to the power supply 970 so that when activated, they remain on for a duration dictated by the notification mechanism even though the processor 960, special-purpose processor 961, and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with aspects of the present disclosure, the microphone may also serve as an audio sensor to facilitate control of notifications, as will be described below. The system 902 may further include a video interface 976 that enables an operation of an on-board camera 930 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio interface layer 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio interface layer 972 or via a distributed computing network. Similarly, such data/information may be readily transferred between computing devices for storage and use according to well-known data/information transfer and storage means, including electronic mail and collaborative data/information sharing systems.

Figure 10:
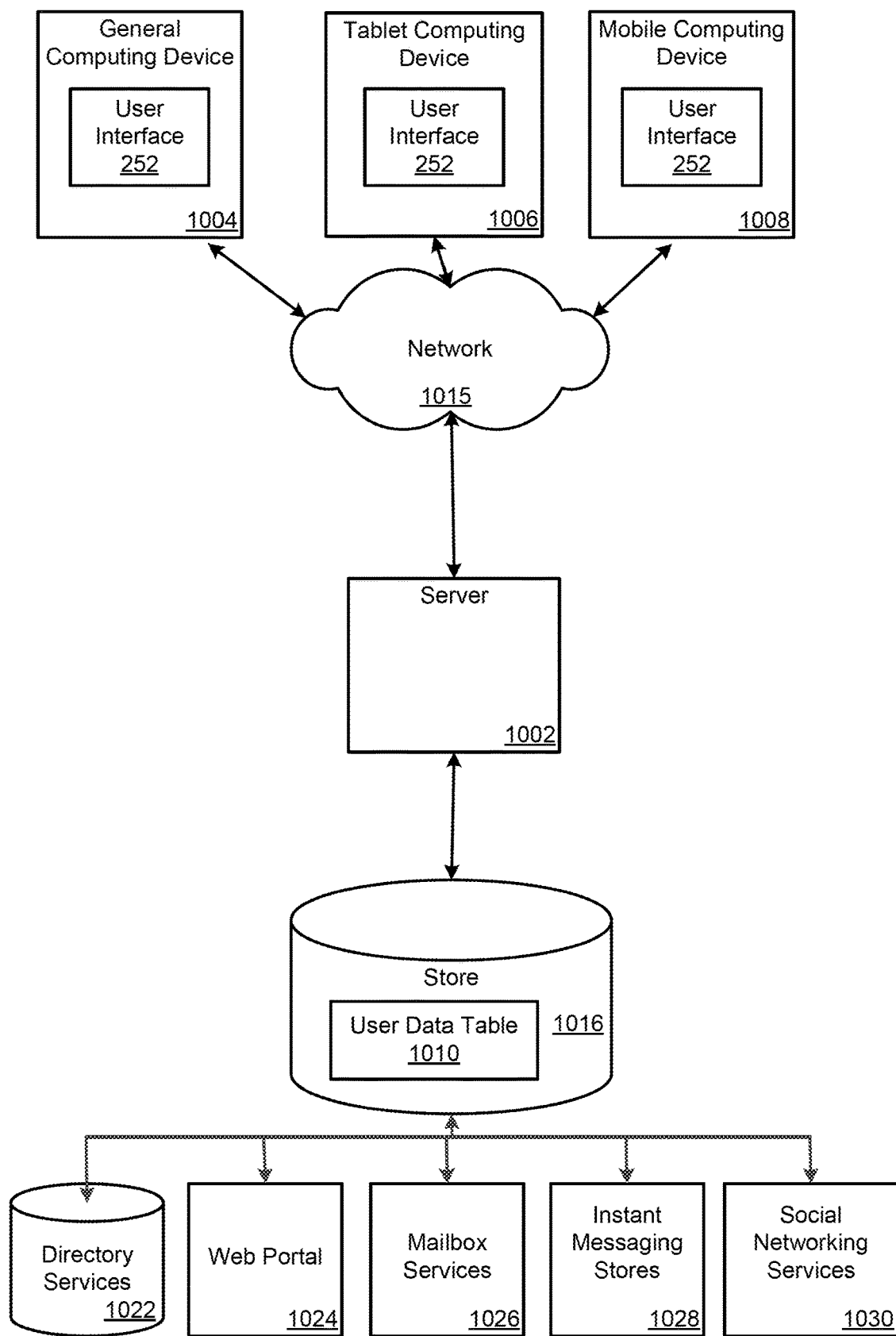
FIG. 10 is a simplified block diagram of a distributed computing system in which aspects of the present disclosure may be practiced.

FIG. 10 illustrates one aspect of the architecture of a system for processing data received at a computing system 1002 (e.g., content provider 102) from a remote source, such as a client device 116A-116E, as described above. Content at a server device 1002 may be stored in different communication channels or other storage types. For example, various game/title images and content update packages may be stored using a directory service 1022, a web portal 1024, a mailbox service 1026, an instant messaging store 1028, or a social networking site 1030. A unified profile API based on the user data table 1010 may be employed by a client that communicates with server device 1002, and/or the content generator may be employed by server device 1002. The server device 1002 may provide data to and from a client computing device such as the client devices 116A-116E through a network 1015. By way of example, a client device 116A-116E described above may be embodied in a personal computer 1004, a tablet computing device 1006, and/or a mobile computing device 1008 (e.g., a smart phone). Any of these configurations of the computing devices may obtain content, such as game/title images and content update packages from the store 1016, in addition to receiving graphical data useable to be either pre-processed at a graphic-originating system, or post-processed at a receiving computing system.

The above specification, examples and data provide a complete description of the manufacture and use of the composition of the invention. Since many aspects of the invention can be made without departing from the spirit and scope of the invention, the invention resides in the claims hereinafter appended.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The exemplary systems and methods of this disclosure have been described in relation to computing devices. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infrared data communications.

Any of the steps, functions, and operations discussed herein can be performed continuously and automatically.

While the flowcharts have been discussed and illustrated in relation to a particular sequence of events, it should be appreciated that changes, additions, and omissions to this sequence can occur without materially affecting the operation of the disclosed configurations and aspects.

A number of variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions that may be implemented with particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an configuration with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

In accordance with at least one example of the present disclosure, a system for applying one or more encrypted updates to encrypted content residing at a computing device is provided. The system may include at least one processor and at least one memory including instructions which when executed by the at least one processor, causes the at least one processor to: receive a content update package that includes encrypted data, decrypt the content update package resulting in at least one of data content or instructions to modify source data, identify an encrypted portion of source data based on the content update package, decrypt the encrypted portion of source data resulting in source data, modify the source data based on the at least one of data content or instructions, and encrypt the modified source data.

In accordance with at least one aspect of the above example, the instructions cause the at least one processor to verify the encrypted modified source data is the same as a gold standard version of the source data. In accordance with at least one aspect of the above example, the instructions that cause the at least one processor to decrypt the content update package and decrypt the encrypted portion of source data execute at a first operating system, and the instructions that cause the at least one processor to modify the source data based on the at least one of data content or instructions execute at a second operating system different from the first operating system, wherein the first operating system and the second operating system execute on the same client device. In accordance with at least one aspect of the above example, the instructions cause the at least one processor to generate a hash value based on the encrypted modified source data and compare the generated hash value to a hash value associated with a gold standard version of the source data. In accordance with at least one aspect of the above example, the instructions cause the at least one processor to determine differences between a gold standard version of the source data and a previous version of the source data, and generate the content update packaged based on the identified differences. In accordance with at least one aspect of the above example, the instructions cause the at least one processor to obtain a gold standard version of the source data if the generated hash value does not match the hash value associated with the gold standard version of the source data. In accordance with at least one aspect of the above example, the instructions cause the at least one processor to provide an indication of a version of the source data to a content provider and receive the content update package from the content provider. In accordance with at least one aspect of the above example, the source data is associated with a portion of a game image file of a first version, and the content update package includes content associated with updating the game image file to a second version, wherein the second version is an updated and later occurring version of the first version. In accordance with at least one aspect of the above example, the instructions cause the at least one processor to update hash data associated with the encrypted modified source data with one or more hashes received in the content update package.

In accordance with at least one example of the present disclosure, a method for applying one or more encrypted updates to encrypted content residing at a computing device is provided. The method may include receiving a content update package that includes encrypted data, decrypting the content update package resulting in at least one of data content or instructions to modify source data, identifying an encrypted portion of source data based on the content update package, decrypting the encrypted portion of source data resulting in source data, modifying the source data based on the at least one of data content or instructions, encrypting the modified source data, and verifying the encrypted modified source data is the same as a gold standard version of the source data.

In accordance with at least one aspect of the above example, the method may include generating a hash value based on the encrypted modified source data and comparing the generated hash value to a hash value associated with the gold standard version of the source data. In accordance with at least one aspect of the above example, the method may include obtaining a gold standard version of the source data if the generated hash value does not match a hash value associated with the gold standard version of the source data. In accordance with at least one aspect of the above example, the method may include determining differences between a gold standard version of the source data and a previous version of the source data, and generating the content update package based on the identified differences. In accordance with at least one aspect of the above example, the method may include updating hash data associated with the encrypted modified source data with one or more hash values associated with the gold standard version of the source data. In accordance with at least one aspect of the above example, the method may include decrypting the content update package with a first encryption key, and decrypting the encrypted portion of source data with a second encryption key different from the first encryption key.

In accordance with at least one example of the present disclosure, a system for generating a content update package for updating encrypted content at a remote location is provided. The system may include at least one processor, and at least one memory including instructions which when executed by the at least one processor, causes the at least one processor to: receive a first version of content, receive a second version of content, determine differences between the first version of content and the second version of content, generate a content update package based on the differences between the first version of content and the second version of content, encrypt at least a portion of the content update package, generate one or more anti-tamper hashes based on the encrypted portion of the update package, include the one or more anti-tamper hashes in the content update package, and provide the content update package to a remote device.

In accordance with at least one aspect of the above example, the instructions cause the at least one processor to include metadata describing the first version of content in the content update package. In accordance with at least one aspect of the above example, the instructions cause the at least one processor to provide the content update package to the remote device that has the second version of content installed. In accordance with at least one aspect of the above example, the instructions cause the at least one processor to provide the first version of content to the remote device. In accordance with at least one aspect of the above example, the instructions cause the at least one processor to provide a second content update package to the remote device, the second content update package including instructions for identifying a portion of data in the second version of content to be replaced with data based on the content update package.

Any one or more of the aspects as substantially disclosed herein.

Any one or more of the aspects as substantially disclosed herein optionally in combination with any one or more other aspects as substantially disclosed herein.

One or means adapted to perform any one or more of the above aspects as substantially disclosed herein.

What is claimed is:

1. A system for applying one or more encrypted updates to encrypted content residing at a computing device, the system comprising: a processor; and memory including instructions which when executed by the processor, causes the processor to: receive a content update package comprising encrypted data; decrypt, by a first operating system of the computing device, the encrypted data using a first security key to identify data content to modify source data; decrypt, using a second security key, encrypted source data to produce the source data; and modify, by a second operating system of the computing device, the source data based on the data content.

2. The system of claim 1, wherein the content update package comprises one or more differences between a first disk image and a second disk image, the first disk image corresponding to a gold standard version of the source data and the second disk image corresponding to a previous version of the source data.

3. The system of claim 2, wherein the first disk image is stored by a content provider external to the computing device and the second disk image is stored by the computing device.

4. The system of claim 2, wherein one or more portions of the second disk image are encrypted using one or more security keys maintained by an entitlement management system of the computing device.

5. The system of claim 1, wherein: the computing device is a gaming console; the source data corresponds to a previous version of gaming content; and the data content is associated with an updated version of the gaming content.

6. The system of claim 1, wherein the data content indicates update instructions for updating the source data from a first version to a second version, and the content update package further comprises security mechanisms.

7. The system of claim 6, wherein the security mechanisms correspond to a plurality of anti-tamper hashes each corresponding to a portion of the data content.

8. The system of claim 7, wherein each of the plurality of anti-tamper hashes corresponds to at least one of a size of data or a location of data within a disk image.

9. The system of claim 1, wherein the content update package further comprises a metadata portion that includes a master file table and data describing a disk image associated with the data content.

10. The system of claim 1, wherein the first operating system coordinates interaction of the second operating with other portions of the computing device.

11. The system of claim 1, wherein the second operating system is provided as space or location for electronic content to install and execute.

12. The system of claim 1, wherein the first operating system comprises a security processor configured to decrypt the data content of the content update package and a corresponding portion of a disk image stored by the computing device.

13. A device for applying one or more encrypted updates to encrypted content, the device comprising: a processor; and memory including instructions which when executed by the processor, causes the processor to: receive a content update package comprising encrypted data; decrypt, by a first operating system of a computing device, the encrypted data to identify a first anti-tamper portion and first data content to modify source data; modify, by a second operating system of the computing device, the source data based on the first data content; encrypt the modified source data; generate a second anti-tamper portion for the encrypted modified source data; and compare the first anti-tamper portion to the second anti-tamper portion.

14. The device of claim 13, wherein decrypting the encrypted data comprises: loading the encrypted data into a storage area of the device; loading encrypted source data in the storage area; decrypting the encrypted data to generate the first data content; and decrypting the encrypted source data to generate the source data.

15. The device of claim 13, wherein the second operating system is used to encrypt the modified source data.

16. The device of claim 13, wherein the instructions further cause the processor to: based on comparing the first anti-tamper portion to the second anti-tamper portion, determine whether the first anti-tamper portion matches the second anti-tamper portion.

17. The device of claim 13, wherein the instructions further cause the processor to: when the first anti-tamper portion is determined to match the second anti-tamper portion, replace encrypted source data corresponding to the source data with the encrypted modified source data.

18. The device of claim 13, wherein the instructions further cause the processor to: when the first anti-tamper portion is determined to not match the second anti-tamper portion, receive a gold standard version of the source data from a content provider; decrypt, by the first operating system of the computing device, the gold standard version to identify the first anti-tamper portion and second data content to modify the source data; and modify, by the second operating system of the computing device, the source data based on the second data content.

19. The device of claim 13, wherein the instructions further cause the processor to: when the first anti-tamper portion is determined to not match the second anti-tamper portion, receive a portion of a gold standard version of the source data from a content provider, wherein the portion of the gold standard version corresponds to a portion of the source data being modified.

20. A method comprising: receiving a content update package comprising encrypted data; decrypting, by a first operating system of a computing device, the encrypted data using a first security key to identify data content to modify source data; decrypting, using a second security key, encrypted source data to produce the source data; and modifying, by a second operating system of the computing device, the source data based on the data content.

* * * * *